(12) United States Patent
Wang

(10) Patent No.: US 12,724,334 B2
(45) Date of Patent: Sep. 1, 2026

(54) PROJECTOR AND PROJECTION POSITIONING METHOD

(71) Applicant: GOERTEK INC., Weifang (CN)

(72) Inventor: Wenyue Wang, Weifang (CN)

(73) Assignee: GOERTEK INC., Weifang (CN)

( * ) Notice: Subject to any disclaimer, the term of this patent is extended or adjusted under 35 U.S.C. 154(b) by 289 days.

(21) Appl. No.: 18/426,455

(22) Filed: Jan. 30, 2024

(65) Prior Publication Data

US 2024/0171714 A1 May 23, 2024

Related U.S. Application Data

(63) Continuation of application No. PCT/CN2021/138146, filed on Dec. 15, 2021.

(30) Foreign Application Priority Data

Aug. 26, 2021 (CN) ........................ 202110991791.9

(51) Int. Cl.
*G03B 21/14* (2006.01)

(52) U.S. Cl.
CPC .................................. *G03B 21/142* (2013.01)

(58) Field of Classification Search
None
See application file for complete search history.

(56) References Cited

U.S. PATENT DOCUMENTS

2011/0119638 A1 5/2011 Forutanpour
2011/0157000 A1 6/2011 Chen
2012/0120069 A1 5/2012 Kodaira et al.
2021/0109428 A1* 4/2021 Ichieda ................ G03B 21/147

FOREIGN PATENT DOCUMENTS

CN 103226411 A 7/2013
CN 104750250 A 7/2015
CN 104750443 A 7/2015
CN 112040206 A 12/2020

(Continued)

OTHER PUBLICATIONS

International Search Report and Written Opinion in Corresponding International Application No. PCT/CN2021/138146, mailed May 30, 2022; 14 pgs.

(Continued)

*Primary Examiner* — Bao-Luan Q Le
*Assistant Examiner* — Danell L Owens
(74) *Attorney, Agent, or Firm* — HAUPTMAN HAM, LLP

(57) ABSTRACT

Disclosed are a projector and a projection positioning method. The projector includes a projector body, a first ranging sensor, a processor and a focal length controller. The projector body includes a projection lens configured to play projection content of a preset area. The first ranging sensor is provided on the projector body and configured to collect position data of a target object within a projection calibration frame formed by the projection lens. The processor is provided on the projector body and at least configured to calculate area data of an adjusted projection calibration frame based on the position data. The focal length controller is communicated with the processor and configured to adjust a focal length of the projection lens according to the area data to change an area of the projection calibration frame played by the projection lens.

8 Claims, 7 Drawing Sheets

(56) References Cited

FOREIGN PATENT DOCUMENTS

| | | | |
|---|---|---|---|
| CN | 112333435 | A | 2/2021 |
| CN | 113612980 | A | 11/2021 |
| JP | 2005195939 | A | 7/2005 |
| WO | 2018010440 | A1 | 1/2018 |

OTHER PUBLICATIONS

Notification to Grant in Corresponding Chinese Application No. 202110991791.9, dated Nov. 4, 2022; 5 pgs.

* cited by examiner

PROJECTOR AND PROJECTION POSITIONING METHOD

CROSS-REFERENCE TO RELATED APPLICATIONS

This application is a continuation application of International Application No. PCT/CN2021/138146, filed on Dec. 15, 2021, which claims priority to Chinese Patent Application No. 202110991791.9, filed on Aug. 26, 2021. The disclosures of the above-mentioned applications are incorporated herein by reference in their entireties.

TECHNICAL FIELD

The present application relates to the technical field of projection, in particular to a projector and a projection positioning method.

BACKGROUND

The rapid development of projection technology and the application of projection equipment have brought great convenience to people's lives and work. However, the current application scenarios of projection equipment are relatively single, and the projection method is simple. It can only project images of a fixed size or at a fixed location. If the projection plane area is small, or there are other items occupying the projection plane area, it is very inconvenient to adjust the display area, the projection calibration frame cannot be flexibly adjusted, and it cannot meet the needs of diversified usage scenarios, affecting the user experience.

The above content is only configured to assist in understanding the technical solutions of the present application, and does not represent an admission that the above content is prior art.

SUMMARY

The present application provides a projector and a projection positioning method, aiming to flexibly adjust the projection calibration frame to meet diversified usage scenarios and user needs, thereby improving user experience In order to achieve the above objective, the present application provides a projector, including:

- a projector body, including a projection lens configured to play a projection content with a preset area;
- a first ranging sensor provided on the projector body and configured to collect position data of a target object within a projection calibration frame formed by the projection lens;
- a processor provided on the projector body and at least configured to calculate area data of an adjusted projection calibration frame based on the position data; and
- a focal length controller communicated with the processor and configured to adjust a focal length of the projection lens according to the area data to change an area of the projection calibration frame played by the projection lens.

In some embodiments, the projector further includes a direction controller communicated with the processor. The processor is further configured to calculate direction data based on the position data, and the direction controller is configured to adjust a direction of the projection calibration frame played by the projection lens based on the direction data calculated by the processor based on the position data.

In some embodiments, the projector body further includes a projection module configured to project and a positioning module configured to position the projection calibration frame, and the projection module and the positioning module are independent with each other;

- the processor and the projection lens are provided on the projection module, and the first ranging sensor is provided on the positioning module.

In some embodiments, the positioning module is provided with a plurality of second ranging sensors facing the projection module, and the plurality of second ranging sensors are dispersedly provided on a side of the positioning module facing the projection module.

In some embodiments, an orthographic projection of the positioning module and an orthographic projection of the projection module coincide with each other.

In some embodiments, both the positioning module and the projection module are provided with fixators connected to a fixed object, and the fixator includes any one of a magnet, a suction cup, and a buckle.

The present application further provides a projection positioning method applied to the above-mentioned projector. The projection positioning method includes:

- playing a projection calibration frame with a preset area, the projection calibration frame includes at least one touch positioning point for adjusting an area of the projection calibration frame or a position of the projection calibration frame;
- collecting the number of touch positioning points touched by a target object, and determining an adjustment mode of the projection calibration frame according to the number of the touch positioning points touched by the target object;
- adjusting the area of the projection calibration frame or the position of the projection calibration frame according to the adjustment mode of the projection calibration frame; and
- projecting within an adjusted projection calibration frame.

In some embodiments, the determining the adjustment mode of the projection calibration frame according to the number of the touch positioning points touched by the target object includes:

- in response to that the number of the touch positioning points touched by the target object is one, determining the adjustment mode of the projection calibration frame to be a position adjustment mode of the projection calibration frame; or
- in response to that the number of the touch positioning points touched by the target object is two, determining the adjustment mode of the projection calibration frame to be an area adjustment mode of the projection calibration frame; when the number of the touch positioning points is two, two touch positioning points are adjacent on the projection calibration frame.

In some embodiments, the determining the adjustment mode of the projection calibration frame according to the number of the touch positioning points touched by the target object includes:

- in response to that the number of the touch positioning points touched by the target object is one, determining the adjustment mode of the projection calibration frame to be a position adjustment mode of the projection calibration frame; or
- in response to that the number of the touch positioning points touched by the target object is two, determining the adjustment mode of the projection calibration frame to be an area adjustment mode of the projection calibration frame; when the number of the touch positioning points is two, two touch positioning points are adjacent on the projection calibration frame.

In some embodiments, the adjusting the area of the projection calibration frame or the position of the projection calibration frame according to the adjustment mode of the projection calibration frame includes:

in response to that the adjustment mode of the projection calibration frame is the area adjustment mode of the projection calibration frame, collecting position data of the two touch positioning points touched by the target object;

calculating a length of the adjusted projection calibration frame based on the position data of the two touch positioning points touched by the target object, and calculating a width of the adjusted calibration frame based on the length and resolution information of a play source of the projector; and calculating an area of the adjusted projection calibration frame according to the length and the width.

In some embodiments, the adjusting the area of the projection calibration frame or the position of the projection calibration frame according to the adjustment mode of the projection calibration frame includes:

in response to that the adjustment mode of the projection calibration frame is the position adjustment mode of the projection calibration frame, collecting position data of the touch positioning point touched by the target object; and calculating a center point coordinate value of the adjusted projection calibration frame based on the position data, and determining a position of the adjusted projection calibration frame according to the center point coordinate value.

In some embodiments, the projector further includes a projection module configured to project and a positioning module configured to position the projection calibration frame, the projection module and the positioning module are independent with each other, and the positioning module is provided with a plurality of second ranging sensors facing the projection module, before the playing the projection calibration frame with the preset area, the method further includes:

receiving distance data of the plurality of second ranging sensors; and in response to that the distance data of the plurality of second ranging sensors are all within a preset threshold range, determining that the projection module and the positioning module are parallel to each other, and playing the projection calibration frame with the preset area.

In the present application, a projection calibration frame with a preset area is played through a projection lens, and the position data of the target object within the projection calibration frame formed by the projection lens is collected through the first ranging sensor. Then, the processor is configured to calculate the area data of the adjusted projection calibration frame according to the position data. Finally, the focal length controller adjusts the focal length of the projection lens according to the area data to change the area of the played projection calibration frame. The projector of the present application is not limited by the projection scenarios, and can flexibly adjust the area or position of the projection calibration frame according to the target object to meet diversified usage scenarios and user needs, thereby improving user experience.

BRIEF DESCRIPTION OF THE DRAWINGS

In order to more clearly illustrate the technical solutions in the embodiments of the present application or in the related art, drawings in the embodiments or in the related art will be briefly described below. Obviously, the drawings in the following description are only some embodiments of the present application. Other drawings can be obtained by those skilled in the art according to the structures shown in the drawings without creative efforts.

Figure 1:
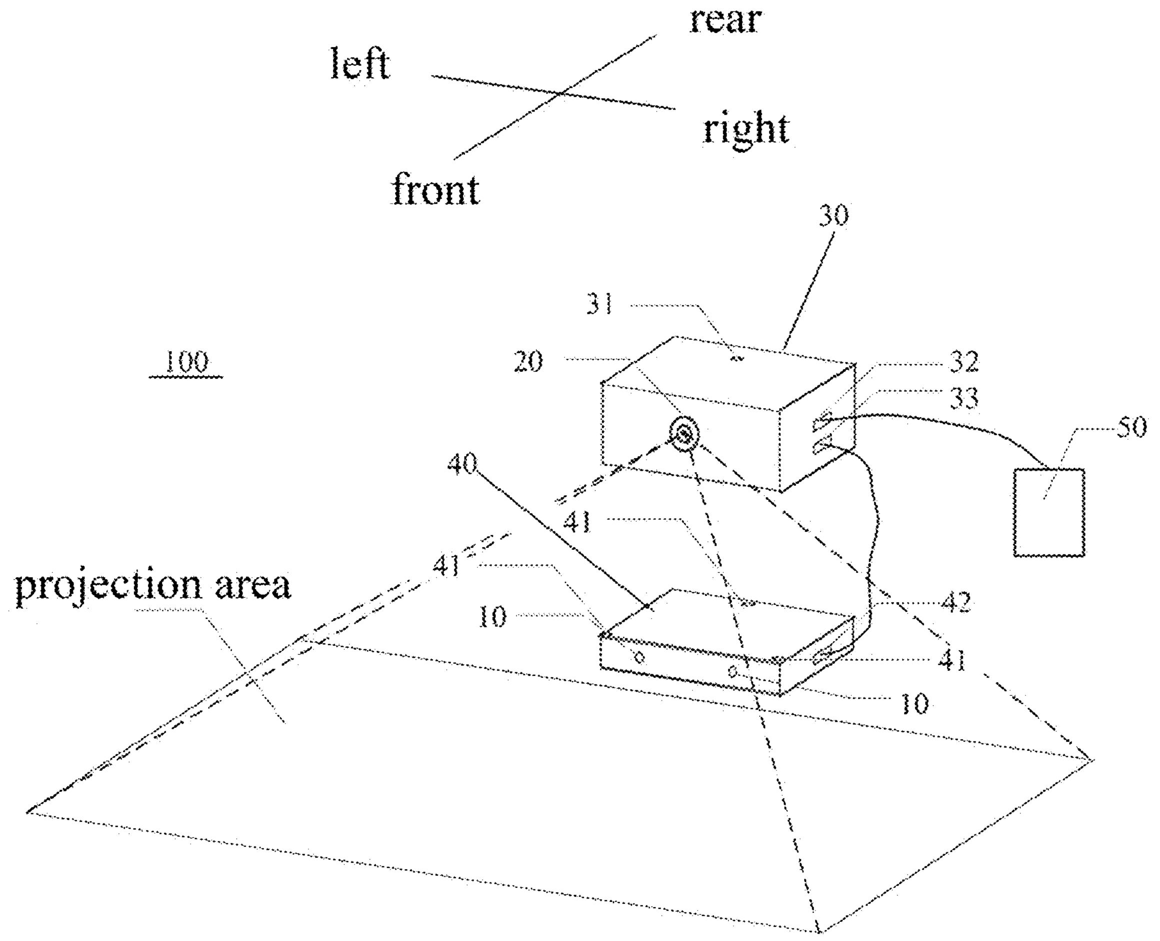
FIG. 1 is a schematic structural view of a projector according to some embodiments of the present application.

The implementation, functional characteristics and advantages of the present application will be further described with reference to the attached drawings in combination with embodiments.

DETAILED DESCRIPTION OF THE EMBODIMENTS

The technical solutions of embodiments of the present application will be clearly and completely described with reference to the drawings of the present application. Obviously, the described embodiments are only some rather than all of the embodiments of the present application. Based on the embodiments of the present application, all other embodiments obtained by those skilled in the art without creative efforts shall fall within the scope of the present application.

It should be noted that all directional indicators (such as up, down, left, right, front, rear, etc.) in the embodiments of the present application are only used to explain the relative positional relationship, movement situation, etc. among components in a specific attitude (as shown in the drawings). If the specific attitude changes, the directional indication also changes accordingly.

The current projection equipment has a single application scenario and a simple projection method. It can only project images of a fixed size or at a fixed position. If the projection plane area is small or other items occupy the projection plane area, it is very inconvenient to adjust the display area and the projection calibration frame cannot be flexibly adjusted, which fails to meet user needs in diverse usage scenarios, affecting user experience.

In view of this, this application proposes a projector and a projection positioning method, aiming to flexibly adjust the projection calibration frame to meet diversified usage scenarios and user needs, and improve user experience.

As shown in FIG. 1, in some embodiments of the present application, a projector 100 is proposed. The projector 100 includes a projector body, a first ranging sensor 10, a processor and a focal length controller.

The projector body includes a projection lens 20 for playing a projection content with a preset area. It should be noted that the projection lens 20 can be a commercially available projection lens 20 and can be divided into short focal length lens, medium focal length lens and telephoto lens according to the focal length.

The first ranging sensor 10 is provided on the projector body and is configured to collect position data of a target object within the projection calibration frame formed by the projection lens 20. It can be understood that the target object is an object configured to adjust the area of the projection calibration frame projected by the projection lens 20. For example, in some embodiments, the target object may be the user's finger, or a rod, stick swung by the user, etc. Even, in some other embodiments, the target object may be a laser pointer controlled by the user.

The projection lens 20 projects a projection calibration frame on the wall or curtain, and the target object adjusts the area or position of the projection calibration frame by moving the touch positioning point on the projection calibration frame. When the target object is manipulated, such as pressing the projection calibration frame with a finger, the first ranging sensor 10 collects finger position data, and the processor converts the position data into coordinate values. The bit depth data of multiple points on the finger surface can be obtained through the first ranging sensor 10. The processor models the shape of the finger through the bit depth data of the finger, so that the currently adjusted finger can be locked. If other fingers of the hand cause interference during the adjustment process, the processor will filter out the interfering fingers and only process the position data of the locating finger.

It should be noted that the first ranging sensor 10 may be a Time of Flight (ToF) sensor, a laser sensor, an ultrasonic sensor, or the like. In order to increase the accuracy of position recognition of the target object, the ToF sensor may be used as the first ranging sensor 10 in these embodiments. The ToF sensor can measure the distance between multiple fingertip recognition points, and then indirectly model the fingertips through the processor to increase the accuracy of position recognition of the target object.

Furthermore, in order to accurately measure distances between multiple targets, the number of the first ranging sensors 10 may be set to multiple, such as 2, 3, etc. In these embodiments, two first ranging sensors 10 are configured to position the positions of the two touch positioning points on the bottom edge of the projection calibration frame.

The processor is provided on the projector body and is at least configured to calculate the area data of the adjusted projection calibration frame based on the position data. It should be noted that the processor may be a general-purpose processor, such as a digital signal processor (DSP), an application specific integrated circuit (ASIC), a field programmable gate array (FPGA), other programmable logic devices, etc.

The focal length controller is communicated with the processor, and is configured to adjust the focal length of the projection lens 20 according to the area data to change the area of the projection calibration frame for playback. Specifically, the communication connection between the focal length controller and the processor can be electrically connected through a data connection line, or can be connected through wireless means such as Bluetooth®, operator network, etc.

Figure 3:
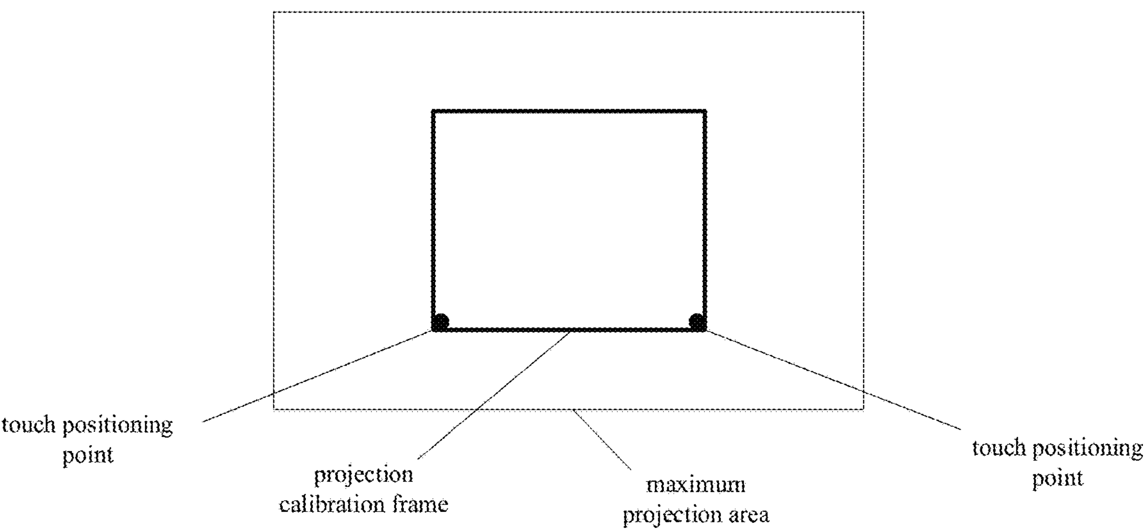
FIG. 3 is a schematic structural view of a maximum projection area and a projection calibration frame projected by the projector according to some embodiments of the present application.

In these embodiments, as shown in FIG. 3, when adjusting the projection calibration frame, the projection lens 20 projects a maximum projection area on the wall or curtain, and the maximum projection area includes the projection calibration frame. The projection calibration frame is a rectangle with four black sides, and there are touch positioning points on the two corners of the bottom edge of the projection calibration frame. It can be set into a round shape for easy marking.

When the user presses two touch positioning points with one finger of both hands, the area adjustment mode of the projection calibration frame is entered. Since the two positioning touch points are located at the two endpoints of the bottom edge of the calibration frame, the length of the bottom edge currently being adjusted can be calculated based on the changing coordinate values of the two fingers. The top edge length remains the same as the bottom edge length, and then the ratio of the resolutions of the rejection content can be configured to calculate the changed lengths of the two sides and the coordinates of the other two corners, and then the changed area of the calibration frame can be calculated. The focal length controller then adjusts the focal length of the projection lens 20 according to the area data to change the area of the projected calibration frame for playback.

In these embodiments, a projection calibration frame with a preset area is played through the projection lens 20, and the position data of the target object in the projection calibration frame formed by the projection lens 20 is collected through the first ranging sensor 10. The processor is configured to calculate the area data of the adjusted projection calibration frame according to the position data. Finally, the focal length controller adjusts the focal length of the projection lens 20 according to the area data to change the area of the played projection calibration frame. The projector 100 of these embodiments is not limited by the projection scene, and can flexibly adjust the area or position of the projection calibration frame through the target object to meet diversified usage scenarios and user needs, and improve user experience.

In some other embodiments of the present application, the projector 100 further includes a direction controller, which is communicated with the processor and configured to adjust the direction of the projection calibration frame played by the projection lens 20 according to the direction data calculated by the processor based on the position data. Specifically, the direction controller and the processor can be electrically connected through a data connection line, or can be connected through wireless means such as Bluetooth®, operator network, etc.

Specifically, when the user presses one of the touch positioning points with only one finger, it enters the position adjustment mode of the projection calibration frame. After the finger of the touch positioning point changes its position, the coordinate value of the touch positioning point changes accordingly. Since the area of the projection calibration frame remains unchanged, the side lengths also remain unchanged. The changed coordinates of the other three corners of the projection calibration frame can be calculated based on the coordinates of the current finger, and then the coordinates of the center point of the projection calibration frame can be calculated. Therefore, the direction controller adjusts the focal length of the projection lens 20 according to the coordinate value of the center point of the projection calibration frame to change the position of the played projection calibration frame.

Figure 2:
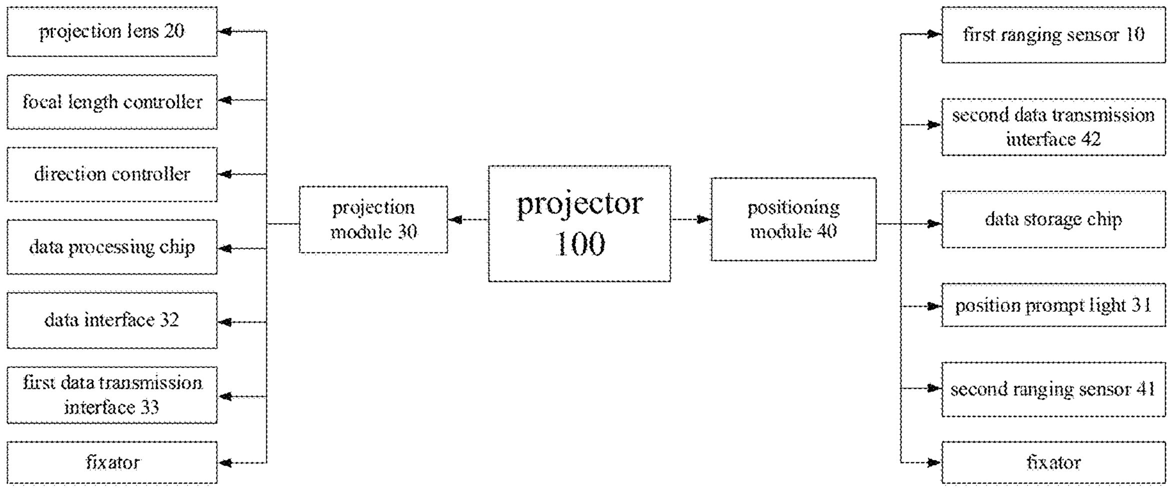
FIG. 2 is a schematic view of modules of the projector according to some embodiments of the present application.

As shown in FIG. 2, in some embodiments of the present application, in order to reduce the size of the projector 100 and increase the portability and simplicity of the projector 100. The projector body also includes a projection module 30 for projection and a positioning module 40 for positioning the projection calibration frame, and the projection module 30 and the positioning module 40 are independent from each other. The processor and the projection lens 20 are provided on the projection module 30. The first ranging sensor 10 is provided on the positioning module 40. The above-mentioned direction controller and focal length controller are both provided on the projection module 30.

The first ranging sensor 10 collects the position data of the target object within the projection calibration frame formed by the projection lens 20, and sends the position data to the processor of the projection module 30 through physical signal lines or wireless methods (such as Wi-Fi, Bluetooth®, etc.). The processor calculates the area data of the adjusted projection calibration frame according to the position data, and calculates the direction data based on the position data. The direction controller and the focal length controller adjust the area or position of the projection calibration frame projected by the projection lens 20 according to the area data and the direction data.

By separating the projection module 30 and the positioning module 40, the projection module 30 and the positioning module 40 of the projector 100 can be carried separately, which is convenient to move, simple to assemble, and can be conveniently used in various scenarios.

In some other embodiments of the present application, the positioning module 40 is provided with a plurality of second ranging sensors 41 disposed facing the projection module 30. The second ranging sensor 41 is configured to measure the distance between the positioning module 40 and the projection module 30, thereby determining the distance between the positioning module 40 and the projection module 30 and determining whether the positioning module 40 and the projection module 30 are parallel.

In order to make the detection of the second ranging sensor 41 detecting whether the positioning module 40 and the projection module 30 are parallel more accurate, the plurality of second ranging sensors 41 are dispersedly provided on a side of the positioning module 40 facing the projection module 30. Specifically, in some embodiments, as shown in FIG. 1, the positioning module 40 and the projection module 30 are rectangular, and the three second ranging sensors 41 are respectively close to the left, right and rear sides of the positioning module 40. When the distance values between the three sides of the projection module 30 and the corresponding three sides of the positioning module 40 detected by the three second ranging sensors 41 are close to each other and within the error range, and the upper and lower distances between the projection module 30 and the positioning module 40 are within the set value error range, it is considered that the projection module 30 has been fixed at this time.

It should be understood that the second ranging sensor 41 may be an ultrasonic sensor, an infrared sensor or a radar positioning and ranging sensor. In order to improve the positioning speed, in these embodiments, the second ranging sensor 41 may use a laser sensor. In addition, the specific installation positions and numbers of the three laser sensors listed above are only for those skilled in the art to understand the technical solution of the present application, and should not be understood as a limitation on the specific location and number of the second ranging sensors 41 between the projection module 30 and the positioning module 40 of the present application. As long as the second ranging sensor 41 is configured to determine the distance between the positioning module 40 and the projection module 30 and whether the positioning module 40 and the projection module 30 are parallel, the specific location and number of the second ranging sensor 41 are not limited in the present application.

It can be understood that in order to make the result of detecting whether the positioning module 40 and the projection module 30 are parallel more visual, a position prompt light 31 can be provided on the projection module 30 or the positioning module 40, and the position prompt light 31 is electrically connected to the processor. When the three laser sensors respectively detect that the distance values between the three sides of the projection module 30 and the corresponding three sides of the positioning module 40 are close to each other and within the error range, and the upper and lower distances between the projection module 30 and the positioning module 40 are within the set value error range, the processor controls the position indicator light 31 to change from red to green, it is considered that the projection module 30 has been fixed.

It should be understood that in other embodiments, a display can be set up to notify the user that the projection module 30 and the positioning module 40 have been set up in parallel by displaying text or video. In addition, a speaker can also be set up to notify the user that the projection module 30 and the positioning module 40 are parallel in voice.

Further, the orthographic projections of the positioning module 40 and the projection module 30 coincide with each other. Because the length and width of the projection module 30 and the positioning module 40 are the same, the three laser sensors are respectively provided on the left, right and rear sides of the positioning module 40. When the three laser sensors respectively detect that the distance values between the three sides of the projection module 30 and the corresponding three sides of the positioning module 40 are close to each other and within the error range, and the upper and lower distances between the projection module 30 and the positioning module 40 are within the set value error range, the processor controls the position indicator light 31 to change from red to green, it is considered that the projection module 30 has been fixed.

In some other embodiments of the present application, the positioning module 40 and the projection module 30 are both provided with a fixator for connecting to the fixed object. It should be noted that the fixed object can be a fixed wall or a fixed bracket. The fixator can be any one of magnet, a suction cup, and a buckle.

As shown in FIG. 1, in some other embodiments of the present application, the projection module 30 also includes a data interface 32 and a first data transmission interface 33. The data interface 32 is provided on the projection module 30 and can be connected to multimedia play sources 50 such as notebook computers, mobile phones, and tablet computers through data connection lines. After the data interface 32 is connected to the multimedia play source 50, the display data is processed by the processor and then projected by the projection lens 20. The first data transmission interface 33 is provided on the projection module 30 and can be connected to the second data transmission interface 42 of the positioning module 40 through a data connection line for receiving data transmitted by the positioning module 40.

The positioning module 40 also includes a second data transmission interface 42 and a data storage chip. The data storage chip is located inside the positioning module 40 and is configured to store data collected by the ToF sensor and the laser sensor. The data transmission interface 42 is configured to transmit the data stored in the data storage chip to the projection module 30 for processing.

Figure 4:
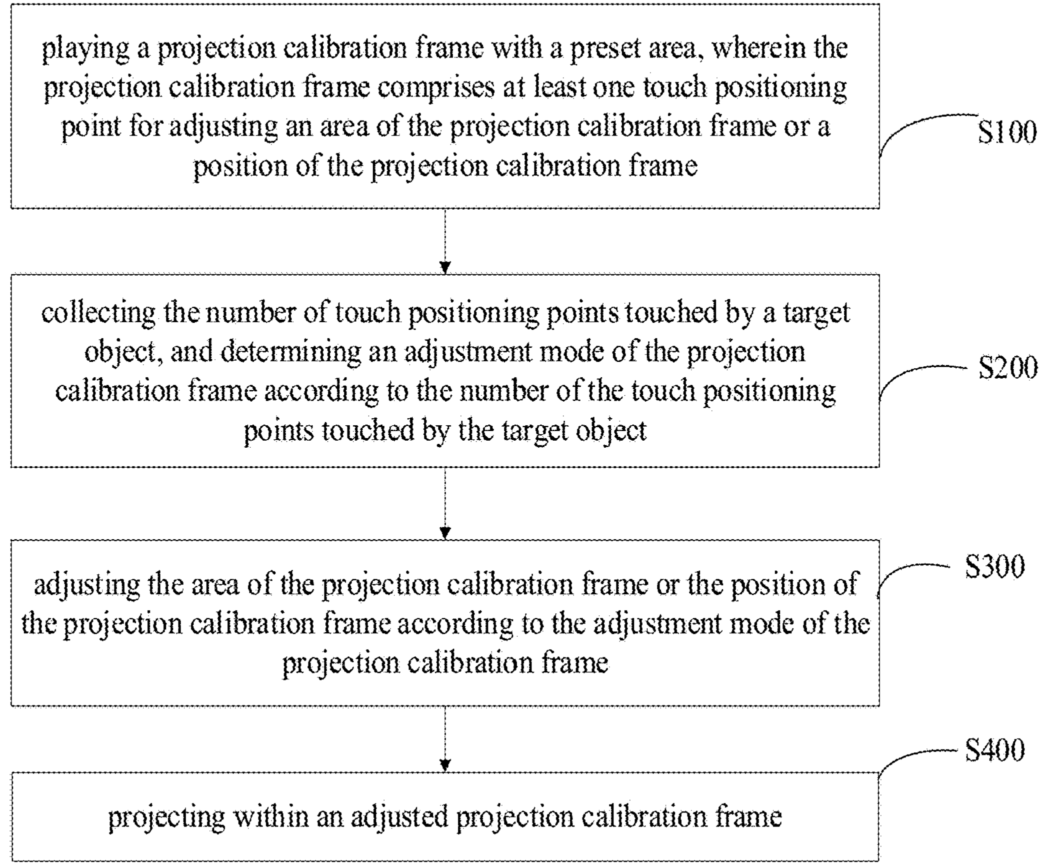
FIG. 4 is a schematic flowchart of a projection positioning method according to some embodiments of the present application.

Based on the hardware architecture of the above projector 100, some embodiments of the projection positioning method of the present application is proposed below. The projection positioning method is applied to the projector 100 of the above-mentioned embodiments. As shown in FIG. 4. The projection positioning method includes:

S100, playing a projection calibration frame with a preset area, wherein the projection calibration frame includes at least one touch positioning point for adjusting an area of the projection calibration frame or a position of the projection calibration frame.

The projection lens 20 of the projector 100 plays a projection calibration frame with a preset area. In these embodiments, due to conventional viewing habits, the projection calibration frame is set to a rectangle. The projection calibration frame at least includes a touch positioning point for adjusting the area or position of the projection calibration frame. Specifically, in these embodiments, there are red hollow circles on the two corners of the bottom edge of the projection calibration frame, which are set as touch positioning points.

S200, collecting the number of touch positioning points touched by a target object, and determining an adjustment mode of the projection calibration frame according to the number of the touch positioning points touched by the target object.

The first ranging sensor 10 of the projector 100 collects the number of touch positioning points touched by the target object, and determines the adjustment mode of the projection calibration frame according to the number of touch positioning points touched by the target object. In these embodiments, the adjustment mode of the projection calibration frame is determined according to the number of touch positioning points touched by the target object. The target object may be as mentioned in the above-mentioned embodiments, the user's finger, a waving rod or stick-like object, a laser pointer, etc.

Specifically, the step of determining an adjustment mode of the projection calibration frame according to the number of the touch positioning points touched by the target object in S200 includes:

S210, in response to that the number of the touch positioning points touched by the target object is two, determining the adjustment mode of the projection calibration frame to be an area adjustment mode of the projection calibration frame; when the number of the touch positioning points is two, the two touch positioning points are adjacent on the projection calibration frame.

When the number of touch positioning points touched by the target object is two, the two touch positioning points are adjacent touch points on the projection calibration frame. The distance between the two touch positioning points is changed through fingers operation to change the length of the projection calibration frame, and then the adjusted projection calibration frame area is calculated based on the adjusted projection calibration frame length and the preset calculation rules.

It should be noted that the processor of the projector 100 will calculate the sides lengths and area of the default projection calibration frame based on the resolution of the content to be projected from the multimedia play source 50. The area of the default projection calibration frame is approximately ¼ of the maximum projection area, and the four side lengths and area of the maximum projection area are fixed values.

It is worth mentioning that the position of the projection calibration frame projected by the projector 100 can be flexibly set in the maximum projection area. For example, as shown in FIG. 3, the projection calibration frame may be located at the bottom of the maximum projection area, and the bottom edge of the projection calibration frame coincides with the bottom edge of the maximum projection area; the projection calibration frame may be located on the side of the maximum projection area, and the side of the projection calibration frame coincides with the side of the maximum projection area; or the projection calibration frame may be located within the maximum projection area, that is, it does not coincide with the four sides of the maximum projection area.

S220, in response to that the number of the touch positioning points touched by the target object is one, determining the adjustment mode of the projection calibration frame to be a position adjustment mode of the projection calibration frame.

When the target object touches one touch positioning point, the touch positioning point is any one of the four corners of the projection calibration frame. Since the area of the projection calibration frame remains unchanged, the side length also remains unchanged. The changed coordinates of the other three corners of the projection calibration frame can be calculated based on the coordinates of the touch positioning point controlled by the current finger, and then the coordinate value of the center point of the projection calibration frame can be calculated. Therefore, the direction controller adjusts the focal length of the projection lens 20 according to the coordinate value of the center point of the projection calibration frame to change the position of the played projection calibration frame.

S300, adjusting the area of the projection calibration frame or the position of the projection calibration frame according to the adjustment mode of the projection calibration frame.

After collecting the number of touch positioning points touched by the target object, the adjustment mode of the projection calibration frame is determined.

In some embodiments, S300, adjusting the area of the projection calibration frame or the position of the projection calibration frame according to the adjustment mode of the projection calibration frame, includes:

S310, in response to that the adjustment mode of the projection calibration frame is the area adjustment mode of the projection calibration frame, collecting position data of the two touch positioning points touched by the target object.

When the first ranging sensor 10 of the projector 100 collects two touch positioning points touched by the target, the area adjustment mode of the projection calibration frame is determined. At this time, the first ranging sensor 10 (i.e., the ToF sensor) collects the position data of the two touch positioning points touched by the target object.

It is worth mentioning that in these embodiments, there are multiple implementation methods for touching the two touch positioning points through a target object. Several typical implementation methods are listed below for description. When adjusting the projection calibration frame, the projection lens 20 projects a maximum projection area on the wall or screen, and the maximum projection area includes the projection calibration frame. The projection calibration frame is a rectangle with four black sides, and there are touch positioning points on the two corners of the bottom edge of the projection calibration frame. If the user chooses to adjust the calibration frame area, he or she needs to use one finger of each hand to press the left and right touch positioning points respectively, and then slide the two fingers horizontally.

Figure 5:
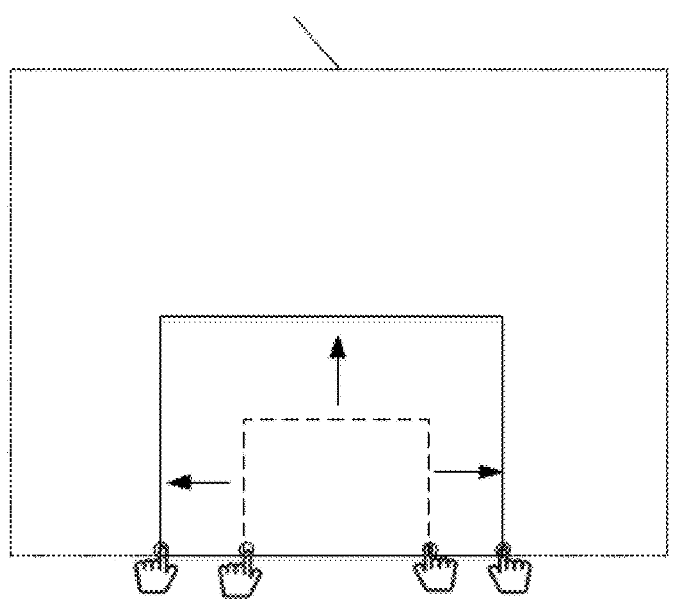
FIG. 5 is a schematic view of a projection calibration frame area according to some embodiments of the present application.
Figure 6:
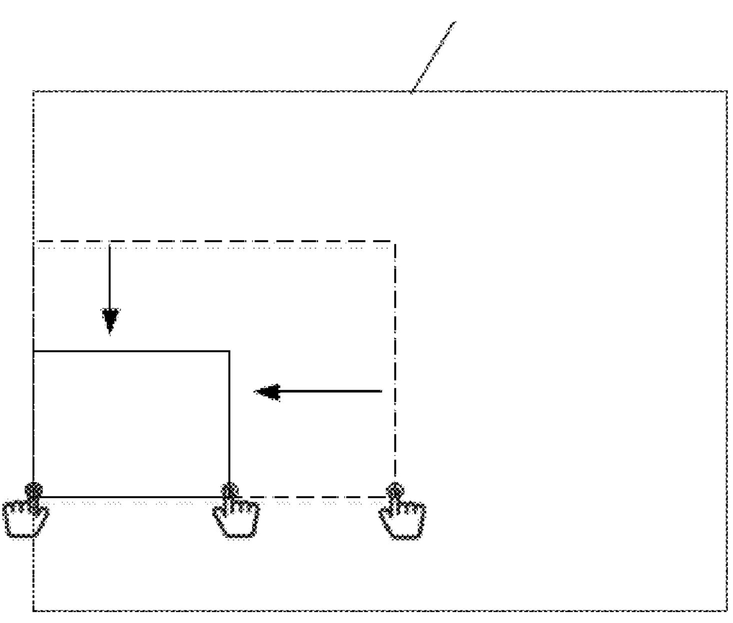
FIG. 6 is a schematic view of a projection calibration frame area according to some other embodiments of the present application.
Figure 7:
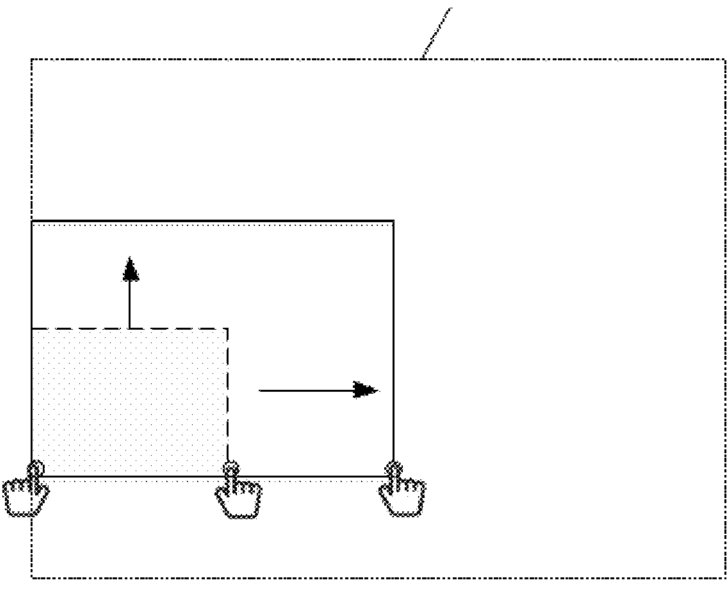
FIG. 7 is a schematic view of a projection calibration frame area according to yet some other embodiments of the present application.
Figure 8:
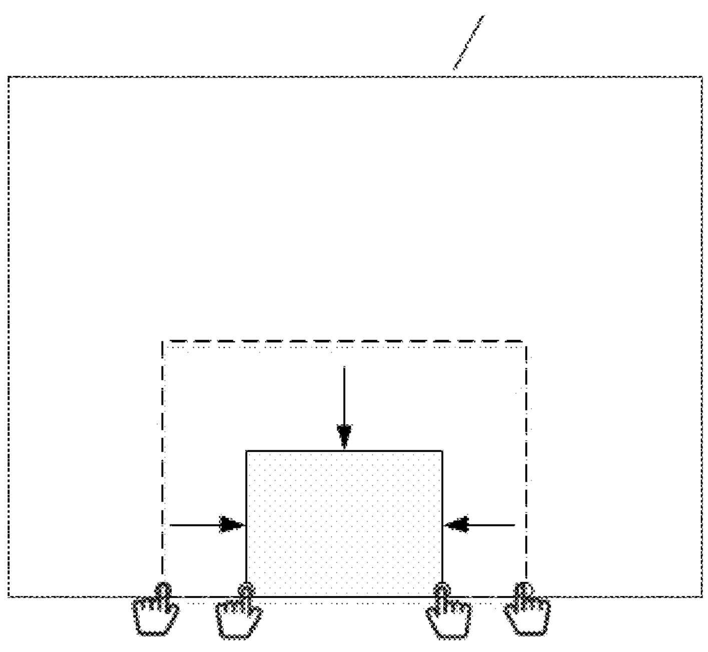
FIG. 8 is a schematic view of a projection calibration frame area according to still some other embodiments of the present application.
Figure 9:
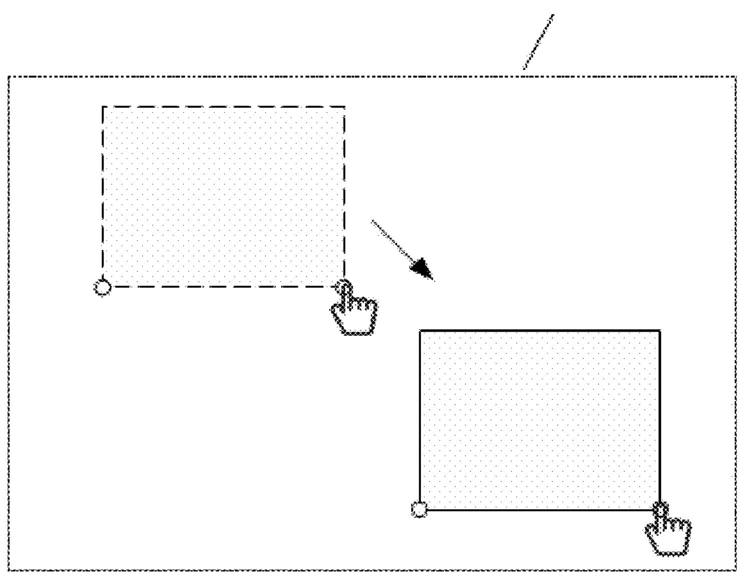
FIG. 9 is a schematic view of a projection calibration frame position according to some embodiments of the present application.

As shown in FIG. 5, the dotted line box represents the unadjusted projection calibration frame, and the solid line frame represents the adjusted projection calibration frame. If two fingers slide away from each other toward the outside of the projection calibration frame, the area of the projection calibration frame becomes larger. As shown in FIG. 6, the dotted line box represents the unadjusted projection calibration frame, and the solid line frame represents the adjusted projection calibration frame. If one finger remains still, the first touch positioning point is obtained, and the other finger slides toward the side close to the one finger to obtain the moving position of the second touch positioning point, such that the projection calibration frame becomes smaller. As shown in FIG. 7, the dotted line box represents the unadjusted projection calibration frame, and the solid line frame represents the adjusted projection calibration frame. If one finger remains still, the first touch positioning point is obtained, and the other finger slides toward the side away from the one finger to obtain the moving position of the second touch positioning point, such that the projection calibration frame becomes larger. As shown in FIG. 8, the dotted line box represents the unadjusted projection calibration frame, and the solid line box represents the adjusted projection calibration frame. If two fingers are close to each other and slide toward the inside of the calibration frame, the projection calibration frame becomes smaller; As shown in FIG. 9, the dotted line box represents the unadjusted projection calibration frame, and the solid line frame represents the adjusted projection calibration frame. In order to facilitate adjustment, it is understandable that a finger can be used to move the touch positioning point as shown in FIG. 9 to adjust the position of the projection calibration frame. Of course, you can also use two fingers to adjust the position of the projection calibration frame. If the two fingers slide in the same direction, the area of the projection calibration frame remains unchanged and the position changes.

S320, calculating a length of the adjusted projection calibration frame based on the position data of the two touch positioning points touched by the target object, and calculating a width of the adjusted calibration frame based on the length and resolution information of the play source of the projector 100.

After collecting the position data of the two touch positioning points through the first ranging sensor 10 (i.e., the ToF sensor), the length information of the adjusted projection calibration frame is calculated based on the position data. According to the length information and the resolution information of the play source of the projector 100, the width information of the adjusted projection calibration frame is calculated.

Figure 10:
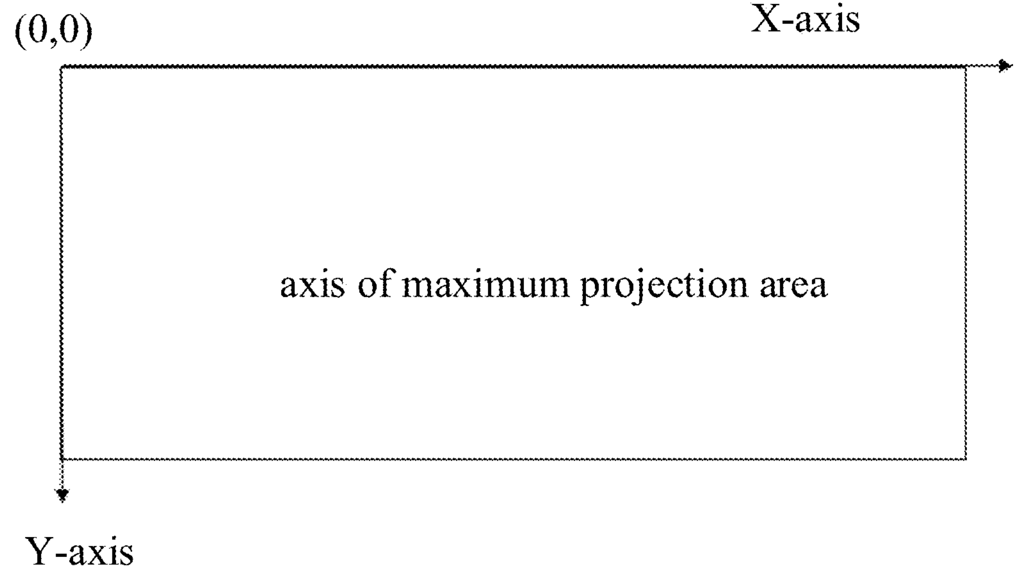
FIG. 10 is a schematic view of a coordinate axis of the maximum projection area of according to some embodiments of the present application.

In some embodiments, as shown in FIG. 10, by default, the upper left corner of the maximum projection area is the coordinate origin of the maximum projection area. The coordinate value is (0, 0). The coordinate axis is as shown in FIG. 10. The distance from the left ToF sensor to the coordinate origin is La, the distance between the left ToF sensor and the right ToF sensor is L3, and the distance from the maximum projection area to the ToF sensor is D. If the left ToF sensor detects that the distance between the finger and the device is $L_1$, and the right ToF sensor detects that the distance between the finger and the device is $L_2$, the triangle composed of the finger, the left ToF sensor, and the right ToF sensor corresponds to the length of the three sides being $L_1$, $L_2$, and $L_3$, then the angle between $L_1$ and $L_3$ is $\alpha$, and the angle between $L_2$ and $L_3$ is $\beta$. When the finger moves the touch positioning point to the left side of the left ToF sensor, the coordinate calculation formula of the touch positioning point is:

$$x = La - \sqrt{L_1^2 - y^2};$$
$$y = L_2\sin\beta - D; \beta = \frac{\arccos(L_2^2 + L_3^2 - L_1^2)}{2L_2L_3}.$$

When the finger moves the touch positioning point to the right side of the right ToF sensor, the coordinate calculation formula of the touch positioning point is:

$$x = La + L_3 + \sqrt{L_2^2 - y^2};$$
$$y = L_1\sin\alpha - D; \alpha = \frac{\arccos(L_1^2 + L_3^2 - L_2^2)}{2L_1L_3}.$$

When the finger moves the touch positioning point between the two ToF sensors, the coordinate calculation formula of the touch positioning point is:

$$x = La + \sqrt{L_2^2 - y^2};$$
$$y = L_1\sin\alpha - D; \alpha = \frac{\arccos(L_1^2 + L_3^2 - L_2^2)}{2L_1L_3}; \text{ or}$$
$$y = L_2\sin\beta - D; \beta = \frac{\arccos(L_2^2 + L_3^2 - L_1^2)}{2L_2L_3}.$$

The position data of touch positioning point moved by fingers can be obtained through the above formula. If the coordinates of the two touch positioning points after adjustment are $P_{lower\text{-}left}$ ($X_{lower\text{-}left}$, Y) and $P_{lower\text{-}right}$ ($X_{lower\text{-}right}$, Y), then the length of the projection calibration frame after the finger adjusts the touch positioning point is $L=X_{lower\text{-}right}-X_{lower\text{-}left}$.

In these embodiments, the width information of the adjusted projection calibration frame can be calculated according to the length information and the resolution information of the play source of the projector 100. Assuming that the resolution of the multimedia play source 50 is 2560*1440 (2K), the aspect ratio of the projection area is set to 16:9. At this time, the aspect ratio of the calibration frame projected by the projector 100 remains 16:9. After adjusting the length of the lower border of the projection calibration frame, if the adjusted coordinates of the two touch positioning points are $P_{lower\text{-}left}$ ($X_{lower\text{-}left}$, Y) and $P_{lower\text{-}right}$ ($X_{lower\text{-}right}$, Y), then the bottom side length at this time is $L=X_{lower-right}-X_{lower-left}$. The height of the calibration frame is $H=(9/16)/L$. Therefore, it's calculated that the lengths of the bottom and the top sides after adjusting are L, the widths of the two lateral sides are H. The calculation formula for the side length or width of the calibration frame is:

Length: $L=X_{lower-right}-X_{lower-left}$;

Width: $H=L/\delta$; ($\delta$=video source resolution aspect ratio).

S330, calculating an area of the adjusted projection calibration frame according to the length and the width.

Since the coordinates of the two touch positioning points after adjustment are known, the bottom and top sides of the projection calibration frame are the same length. In addition, the width of the adjusted projection calibration frame is known, the coordinates of the rest two corner of the projection calibration frame excluding the two touch positioning points can be obtained. Finally the area of the adjusted projection calibration frame can be calculated. The focal length controller adjusts the focal length of the projection lens 20 according to the obtained area to change the area of the played projection calibration frame.

S340, in response to that the adjustment mode of the projection calibration frame is the position adjustment mode of the projection calibration frame, collecting position data of the touch positioning point touched by the target object.

If the projection calibration frame adjustment mode is the position adjustment mode of the projection calibration frame, the ToF sensor collects position data of the touch positioning point touched by the target object.

It is worth mentioning that in these embodiments, a target object is configured to touch one of the touch positioning points. Typical implementations are listed below for description. As shown in the FIG. 9, if the user chooses to adjust the position of the projection calibration frame, he or she only needs to use a finger of left or right hand to press the touch positioning point and then slide in any direction. The projection calibration frame can move according to the sliding trajectory of the finger.

S350, calculating a center point coordinate value of the adjusted projection calibration frame based on the position data, and determining a position of the adjusted projection calibration frame according to the center point coordinate value.

When adjusting the position of the projection calibration frame, since the lengths of the four sides of the projection calibration frame remain unchanged, the coordinate value of the center point of the projection calibration frame can be calculated. Assume that the length and width of the calibration frame are L and H respectively, and when the finger presses the touch positioning point in the lower left corner of the calibration frame to move the calibration frame, the coordinate value of the touch positioning point after moving can be obtained through the above step S320, which is (x, y), then the coordinate value of the center point of the calibration frame is $(x+L/2, y-H/2)$. After the coordinate value of the center point of the projection calibration frame is calculated, the illumination direction of the projection lens 20 is adjusted through the direction controller, thereby changing the position of the projection calibration frame.

S400, projecting within an adjusted projection calibration frame.

After adjusting the position or area of the projection calibration frame, when the ToF sensor detects that the finger has not moved for more than a preset time, or no finger is detected, it is judged that the adjustment process of the projection calibration frame is over. Then the projection calibration frame disappears, and the content to be projected is projected within the adjusted projection calibration frame.

It should be noted that the preset time can be set according to the actual situation, such as setting 15 s, 30 s, one minute, etc.

In these embodiments, a projection calibration frame with a preset area is played through the projection lens 20, and the number of touch positioning points touched by the target object is collected, and the adjustment mode of the projection calibration frame is determined according to the number of touch positioning points touched by the target object. The area or position of the projection calibration frame is adjusted according to the adjustment mode of the projection calibration frame. Finally, the focal length of the projection lens 20 is adjusted according to the area data through the focal length controller to change the area of the projection calibration frame for playback. The direction of the projection calibration frame played by the projection lens 20 is adjusted by a direction controller according to the direction data calculated by the processor based on the position data. Finally, it is projected within the adjusted projection calibration frame range. The projector 100 of these embodiments is not limited by the projection scene, and can flexibly adjust the area or position of the projection calibration frame through the target object to meet diversified usage scenarios and user needs, and improve user experience.

Figure 11:
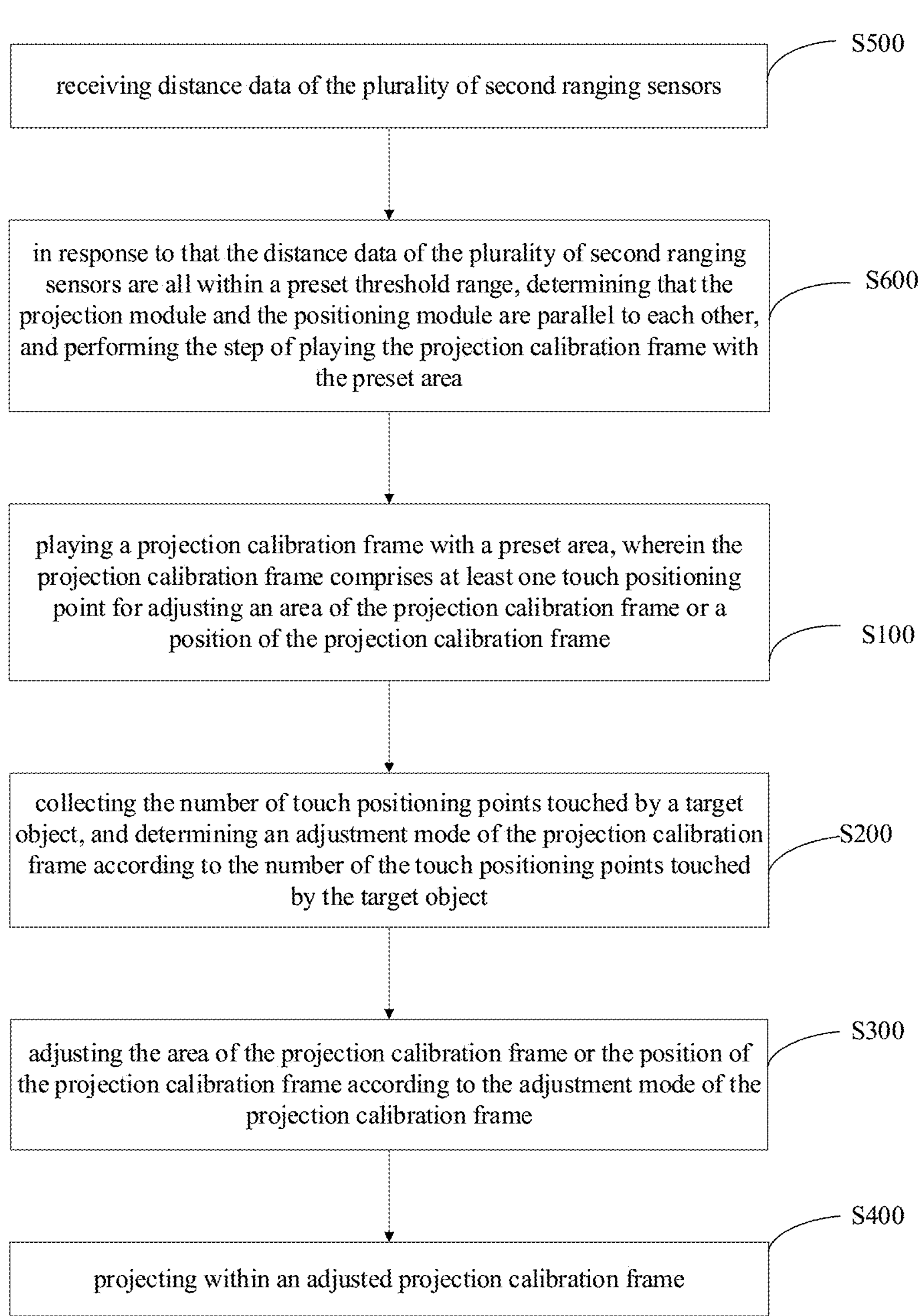
FIG. 11 is a schematic flowchart of a projection positioning method according to some other embodiments of the present application.

Based on the same inventive concept, as shown in FIG. 11, the present application also proposes some other embodiments.

In some embodiments, the projector 100 includes a projection module 30 for projection and a positioning module 40 for positioning the projection calibration frame. The projection module 30 and the positioning module 40 are independent from each other. The positioning module 40 is provided with a plurality of second ranging sensors 41 facing the projection module 30.

The second ranging sensor 41 is configured to measure the distance between the positioning module 40 and the projection module 30 to determine the distance between the positioning module 40 and the projection module 30 and whether the positioning module 40 and the projection module 30 are parallel. It should be understood that the second ranging sensor 41 may be an ultrasonic sensor, an infrared sensor, or a radar positioning and ranging sensor. In order to improve the positioning speed, in these embodiments, the second ranging sensor 41 may use a laser sensor.

S100, before the step of playing the projection calibration frame with a preset area, the method further includes:

S500, receiving distance data of the plurality of second ranging sensors 41.

The projector 100 receives distance data from multiple second ranging sensors 41. In these embodiments, the positioning module 40 and the projection module 30 are rectangular, and the three second ranging sensors 41 are respectively provided on the left side, right side and rear side of the positioning module 40.

S600, in response to that the distance data of the plurality of second ranging sensors 41 are all within a preset threshold range, determining that the projection module 30 and the positioning module 40 are parallel to each other, and performing the step of playing the projection calibration frame with the preset area.

When the three second ranging sensors 41 respectively detect that the distance values of the three bottom sides of the projection module 30 and the positioning module 40 are within the preset threshold range, and the upper and lower distances between the projection module 30 and the positioning module 40 are within the set value error, the projection module 30 is considered to have been fixed at this time. At this time, it means that the projection module 30 and the positioning module 40 are parallel to each other, which meets the basic conditions for projection by the projector 100. Next, the step of playing a projection calibration frame with a preset area is performed.

Each module or step of the present application can use a general computing device to implement the above-mentioned functions of the projector or projection positioning method. A general-purpose computing device generally includes a processor and a memory. The memory is used to store instructions. When the instructions are executed by the processor, the computing device executes each step or each program module of the present application.

The above are only some embodiments of the present application, and do not limit the patent scope of the present application. Under the inventive concept of the present application, equivalent structural transformations made by using the contents of the description and drawings of the present application, or direct/indirect application in other related technical fields are included in the patent protection scope of this application.

What is claimed is:

1. A projector, comprising:

a projector body, comprising a projection lens configured to play a projection content with a preset area;

a first ranging sensor provided on the projector body and configured to collect position data of a target object within a projection calibration frame formed by the projection lens;

a processor provided on the projector body and at least configured to calculate area data of an adjusted projection calibration frame based on the position data; and a focal length controller communicated with the processor and configured to adjust a focal length of the projection lens according to the area data to change an area of the projection calibration frame played by the projection lens, wherein the projector body further comprises a projection module configured to project and a positioning module configured to position the projection calibration frame, and the projection module and the positioning module are independent with each other;

the processor and the projection lens are provided on the projection module, and the first ranging sensor is provided on the positioning module; and an orthographic projection of the positioning module and an orthographic projection of the projection module coincide with each other, wherein the positioning module is provided with a plurality of second ranging sensors facing the projection module, and the plurality of second ranging sensors are dispersedly provided on a side of the positioning module facing the projection module.

2. The projector of claim 1, further comprising:

a direction controller communicated with the processor, wherein the processor is further configured to calculate direction data based on the position data, and the direction controller is configured to adjust a direction of the projection calibration frame played by the projection lens based on the direction data calculated by the processor based on the position data.

3. The projector of claim 1, wherein both the positioning module and the projection module are provided with fixators connected to a fixed object, and the fixator comprises any one of a magnet, a suction cup, and a buckle.

4. A projection positioning method applied to the projector of claim 1, comprising:

playing a projection calibration frame with a preset area, wherein the projection calibration frame comprises at least one touch positioning point for adjusting an area of the projection calibration frame or a position of the projection calibration frame;

collecting the number of touch positioning points touched by a target object, and determining an adjustment mode of the projection calibration frame according to the number of the touch positioning points touched by the target object;

adjusting the area of the projection calibration frame or the position of the projection calibration frame according to the adjustment mode of the projection calibration frame; and projecting within an adjusted projection calibration frame.

5. The projection positioning method of claim 4, wherein the determining the adjustment mode of the projection calibration frame according to the number of the touch positioning points touched by the target object comprises:

in response to that the number of the touch positioning points touched by the target object is one, determining the adjustment mode of the projection calibration frame to be a position adjustment mode of the projection calibration frame; or in response to that the number of the touch positioning points touched by the target object is two, determining the adjustment mode of the projection calibration frame to be an area adjustment mode of the projection calibration frame; when the number of the touch positioning points is two, two touch positioning points are adjacent on the projection calibration frame.

6. The projection positioning method of claim 5, wherein the adjusting the area of the projection calibration frame or the position of the projection calibration frame according to the adjustment mode of the projection calibration frame comprises:

in response to that the adjustment mode of the projection calibration frame is the area adjustment mode of the projection calibration frame, collecting position data of the two touch positioning points touched by the target object;

calculating a length of the adjusted projection calibration frame based on the position data of the two touch positioning points touched by the target object, and calculating a width of the adjusted calibration frame based on the length and resolution information of a play source of the projector; and calculating an area of the adjusted projection calibration frame according to the length and the width.

7. The projection positioning method of claim 5, wherein the adjusting the area of the projection calibration frame or the position of the projection calibration frame according to the adjustment mode of the projection calibration frame comprises:

in response to that the adjustment mode of the projection calibration frame is the position adjustment mode of the projection calibration frame, collecting position data of the touch positioning point touched by the target object; and calculating a center point coordinate value of the adjusted projection calibration frame based on the position data, and determining a position of the adjusted projection calibration frame according to the center point coordinate value.

8. The projection positioning method of claim 4, wherein the projector further comprises a projection module configured to project and a positioning module configured to position the projection calibration frame, the projection module and the positioning module are independent with each other, and the positioning module is provided with a plurality of second ranging sensors facing the projection module, before the playing the projection calibration frame with the preset area, the method further comprises:

receiving distance data of the plurality of second ranging sensors; and in response to that the distance data of the plurality of second ranging sensors are all within a preset threshold range, determining that the projection module and the positioning module are parallel to each other, and playing the projection calibration frame with the preset area.

* * * * *